(12) United States Patent
Hartsfield et al.

(10) Patent No.: US 6,359,355 B1
(45) Date of Patent: *Mar. 19, 2002

(54) HOT DROPPED SHELL AND SEGMENTED STATOR TOOTH MOTOR

(75) Inventors: Richard E. Hartsfield, Chesterfield, MO (US); Michael E. Moore, Princeton, IN (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/528,829

(22) Filed: Mar. 20, 2000

(51) Int. Cl.[7] .............................. H02K 5/00; H02K 1/16
(52) U.S. Cl. ......................... 310/89; 310/254; 310/258
(58) Field of Search .............................. 310/216–218, 310/254–258, 89, 42; 29/596–598

(56) References Cited

U.S. PATENT DOCUMENTS

| | | | |
|---|---|---|---|
| 1,756,672 A | 4/1930 | Barr | |
| 1,779,950 A | 10/1930 | Reichel | |
| 1,901,315 A | 3/1933 | McCarty | |
| 2,330,824 A | * 10/1943 | Granfield | 310/216 |
| 2,688,103 A | 8/1954 | Sheldon | |
| 2,774,000 A | 12/1956 | Ross | |
| 3,056,896 A | 10/1962 | Ludemann et al. | |
| 3,260,875 A | 7/1966 | Evans | |
| 3,760,209 A | 9/1973 | Hult | |
| 3,873,861 A | 3/1975 | Halm | |
| 4,015,154 A | * 3/1977 | Tanaka et al. | 310/42 |
| 4,048,530 A | 9/1977 | Kaufman, Jr. | |
| 4,128,527 A | 12/1978 | Kinjo et al. | |
| 4,217,510 A | 8/1980 | Detinko et al. | |
| 4,786,834 A | * 11/1988 | Grant et al. | 310/194 |
| 4,885,496 A | 12/1989 | Wheeler | |
| 5,008,572 A | 4/1991 | Marshall et al. | |
| 5,095,612 A | 3/1992 | McAvena | |
| 5,134,327 A | 7/1992 | Sumi et al. | |
| 5,256,926 A | * 10/1993 | Hagenlocher et al. | 310/259 |
| 5,287,030 A | 2/1994 | Nutter | |
| 5,583,387 A | 12/1996 | Takeuchi et al. | |
| 5,729,072 A | * 3/1998 | Hirano et al. | 310/258 |
| 5,786,651 A | * 7/1998 | Suzuki | 310/259 |
| 5,806,169 A | 9/1998 | Trago et al. | |
| 6,034,456 A | * 3/2000 | Osama et al. | 310/90.5 |
| 6,040,647 A | * 3/2000 | Brown et al. | 310/89 |
| 6,049,153 A | * 4/2000 | Nishiyama et al. | 310/156 |

FOREIGN PATENT DOCUMENTS

| | | |
|---|---|---|
| DE | 44 36 898 A1 | 4/1995 |
| EP | 0596798 A1 | 5/1994 |
| EP | 0772276 A1 | 7/1997 |
| GB | 1 427 417 | 3/1976 |
| GB | 2033674 A | 5/1980 |
| GB | 2159338 A | 11/1985 |
| JP | 62012351 | 1/1987 |
| WO | WO87/07097 | 11/1987 |
| WO | WO96/31936 | 10/1996 |

OTHER PUBLICATIONS

Yaskawa Motor Catalog, Yaskawa Electric America, Inc., 4 pages (page numbers unknown), dated Jul. 1997.

* cited by examiner

Primary Examiner—Tran Nguyen
(74) Attorney, Agent, or Firm—Howell & Haferkamp, L.C.

(57) ABSTRACT

The construction of an electromagnetic device, such as an electric motor, has a segmented stator with a plurality of stator teeth held in a circular pattern solely by a shell of the motor that has been hot dropped over the stator teeth.

17 Claims, 11 Drawing Sheets

HOT DROPPED SHELL AND SEGMENTED STATOR TOOTH MOTOR

FIELD OF THE INVENTION

The present invention pertains to the construction of an electromagnetic device, such as an electric motor, having a segmented stator with stator teeth held in a circular pattern solely by a shell of the motor that has been hot dropped over the stator teeth.

BACKGROUND ON THE INVENTION

Current trends in the design of electromagnetic machines such as motors have led to compact designs of high efficiency motors. The motor designs have obtained high output power to volume ratios through their use of high magnetic flux density (or "high remanence") magnets on their rotors and high density windings of their stators, increasing efficiency, and through optimized thermal design which increases the motor's ability to dissipate losses.

With the reduction in size of these high efficiency motors the precision with which their components' parts are assembled becomes more important. Specifically, as the size of a motor becomes increasingly smaller, the size and accuracy with which the air gap (which separates the exterior surface of its rotor from the interior surface of its stator) must be similarly reduced in order to compare favorably to a larger model with similar performance characteristics. In addition, with decreasing motor size, the tolerances of the bearings and their associated mounting diameters, rotor shaft and stator bore center axes also decrease, and the slightest misalignment can result in negative effects on motor performance, in increased bearing wear which significantly decreases the operational life of the motor or in contact of the rotating rotor with the stator bore which prevents its proper functioning all together.

Compact high efficiency motors are constructed of basically the same component parts typical to most motors, those being the stator, which is the stationary electromagnetic component of the motor, the rotor, which is the rotating electromagnetic component of the motor, and the endbells, which locate the rotor in relationship to the stator. To achieve the necessary tolerances for the motor's compact size, each of the component parts of the motor must be machined and assembled with high accuracy relative to the other component parts of the motor. The stator must be assembled in the motor housing shell and the motor housing shell must be manufactured to align or register the center axes of the stator bore relative to the housing shell. The endbells are machined with reference to the stator center bore. By machining and assembling each of the component parts of the motor with reference to the other component parts of the motor, the center axis of the rotor is closely registered with the center axes of the bearings mounted in the endbells which, in turn, are registered with the center axis of the stator bore when the component parts are assembled in the motor. The precise machining and assembly of the motor component parts is necessary to properly position the rotor in the stator bore and the rotor bearings in the endbell bearing seats. The extremely precise machining and assembly of the motor component parts comprise a major portion of the expense involved in manufacturing compact, high efficiency motors.

SUMMARY OF THE INVENTION

The present invention is an electromagnetic device, such as a motor, having component parts and a method of assembly that provide a motor of compact size which provides higher output performance and higher efficiency than similarly sized motors. The novel features of the invention are in the constructions of its component parts and in their method of assembly and, although described as applied to a motor, they may also be applied to alternators and generators. The improvements accomplished by these specific design and manufacturing techniques give higher torque density and improved thermal conductivity (allowing the motor to dissipate any losses more effectively). The design concepts under consideration here result in a device which is optimized to minimize cogging and torque ripple and provide uniform back EMF, which are significant contributors to output motion quality.

The motor of the invention is basically comprised of a stator assembly consisting of a wound stator core contained in a housing shell with a pair of endbells attached to the opposite ends of the housing shell, impregnating resin or encapsulant, and a rotor assembly. The novel features of the motor are in its component parts and the method in which they enclose the electromagnetic device, i.e., the stator and rotor of the motor. Therefore, the stator construction and rotor construction are described in only general terms with it being understood that alternative stator and rotor constructions may be employed with the invention.

The stator is a segmented stator comprised of stacks of stator laminates with each stack surrounded by an individual winding. Wound stacks are arranged in a circle in preparation for their being assembled with the housing shell.

The housing shell is tubular having a hollow interior and openings to the interior in opposite first and second end surfaces of the shell. The interior of the shell is machined to a precise diameter, and then the opposite first and second end surfaces are machined flat and perpendicular to the center axis of the shell interior. A series of pin holes is machined into each of the end surfaces of a specific depth to be described below. The shell is heated, allowing it to expand slightly, and then is hot-dropped over the circular cluster of wound stator stacks in precise alignment to the orientation of the stacks. A printed circuit board is then connected to the terminals of the stator windings and is positioned so that it is adjacent the stator windings at the rear of the stator assembly.

Both the front and rear or first and second endbells are cast from aluminum (although other materials may also be used). Steel bearing support rings are centered in the endbells as they are cast with a larger of the two bearing support rings being cast into the forward or first endbell. The endbells then receive basic machining creating a series of fastener through holes and threaded holes, and creating mating surfaces on the endbells having pilot holes machined therein. Steel pins are inserted into the pilot holes.

The endbells are positioned so that they are adjacent the opposite first and second end surfaces of the housing shell with the front end bell positioned adjacent to the first end surface and the rear end bell positioned adjacent to the second end surface. The endbell center axises are aligned with the axis of the stator bore, with the steel shear pins closely related with the matching pilot holes drilled into the housing shell. The end bells are then pressed into position over the first and second end surfaces of the housing shell with the end bell pins broaching into the pin holes of the shell end surfaces providing a precise and tolerance independent fit of the end bells over the opposite first and second end surfaces of the housing shell. The depth of the receiving holes in the housing shell is such there will be sufficient space at the bottom of the drilled hole to receive the shavings produced by the broaching process. The pins resist relative shear and torsional forces between the endbells and the housing shell. Bolts are inserted through the through holes in the front endbell and are screwed into a fastener threaded holes in the rear endbell in order to further secure in tension the endbells on the opposite end surfaces of the housing shell.

A removable core fixture assembly is inserted through a shaft opening of one of the endbell bearing support rings, through the stator bore, and through the shaft opening in the opposite endbell bearing support ring in preparation for injection of the encapsulant. An impregnating resin or encapsulant is then injected through one or more of the series of injection openings in one of the endbells. The encapsulant flows axially through the stator assembly permeating the stator core and the endbells until it passes through the injection venting openings of the opposite endbell. The core assembly excludes this material from the bore and bearing regions of the stator assembly. The encapsulant is cured and the core and associated fixturing are removed.

The front or first end bell's bearing bore is then machined in the steel bearing support ring cast into the front endbell. The front bearing bore is machined with its center axis referenced from or coaxially aligned with the center axis of the stator bore and axially referenced from the front of the stator wound core assembly. Either simultaneously or in a subsequent operation, the rear bearing bore is machined in the steel bearing support ring cast into the rear endbell. The rear bearing bore diameter is referenced from the stator bore diameter.

Front and rear retainer features are then machined into the front and rear end bells, machined concentrically to and referenced from the stator bore center axis. The axial locations of these features are referenced from or are in register with the axial depth of the front bearing bore.

The rotor is comprised of a one piece magnetic steel rotor shaft and core combination having a series of magnetic rings bonded on its exterior. Ball bearings are pressed to precise locations on the opposite ends of the rotor shaft at opposite ends of the magnet rings with the bearing on the rear end of the shaft having a smaller diameter than either the bearing on the front end of the shaft or the magnet ring, and with the bearing on the front end of the shaft having a larger diameter than that of the rotor core which, for example, may be comprised of the outer diametral surface of the magnet ring.

The rotor is held in precise alignment with the stator assembly and inserted into the stator by first inserting the rearward end of the rotor with its smaller bearing through the larger bearing bore at the front endbell of the rotor. The rearward end of the shaft and its smaller bearing pass through the stator bore until the rear bearing is positioned adjacently to the bearing bore in the rear endbell and the front bearing is positioned adjacently to the bearing bore in the front endbell. The rotor is then pressed into place with a press fit of the outer race of the front bearing in its housing and with a transitional or close slip fit of the rear bearing in its housing. The front bearing is pressed into the bearing support ring in the front endbell until it engages against the annular shoulder formed in the bearing support ring. A front bearing retainer device is then installed at the front of the larger bearing to help prevent long-term creepage. A bearing preload spring is then placed over the rear end of the rotor shaft and against the outer race of the rear bearing. The rear bearing retainer is then placed over the rear end of the shaft and against the preload spring and is secured to the rear endbell. The rear retainer is positioned in an annular seat that has been precisely machined in axial relation to the front bearing seat, resulting in the virtual elimination of variation in bearing preloading due to tolerance stack up. The rear bearing retainer bore is machined to precise concentricity with the stator bore in order to allow the accurate location of feedback devices relative to the rotor and stator assemblies.

The construction of the motor and its method of assembly maintains precision positioning of the rotor at the center of the stator bore with a uniform air gap between the stator bore interior surface and the rotor exterior surface and with the rotor center axis precisely aligned with the center axis of the stator bore as well as the center axes of the rotor bearings.

DESCRIPTION OF THE DRAWINGS

Further features of the invention will be discussed in the following detailed description of the preferred embodiment of the invention and in the drawing figures wherein.

DESCRIPTION OF THE PREFERRED EMBODIMENT

Figure 1:
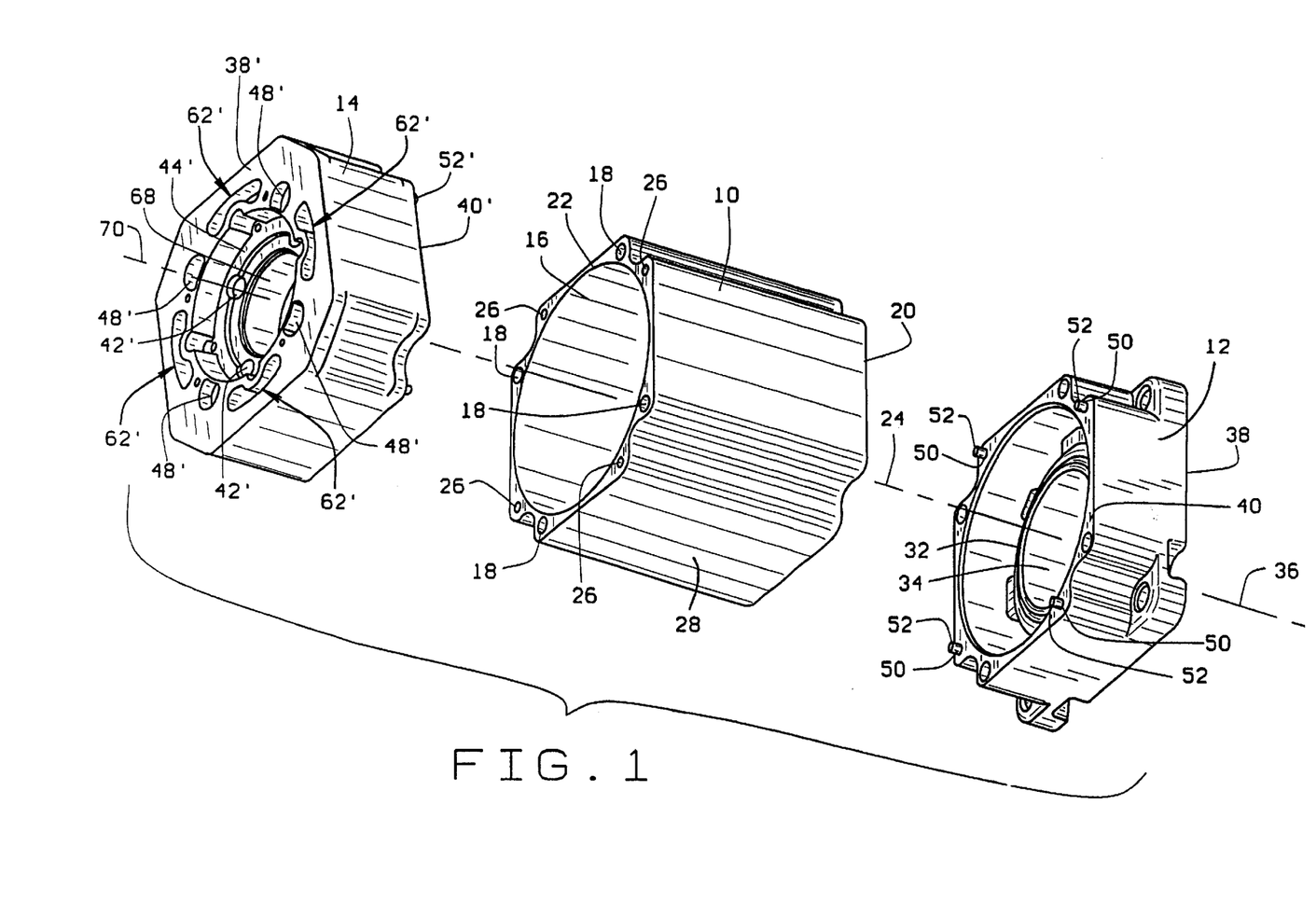
FIG. 1 is an exploded view showing the housing shell and front and rear endbells of the motor enclosure of the invention.
Figure 2:
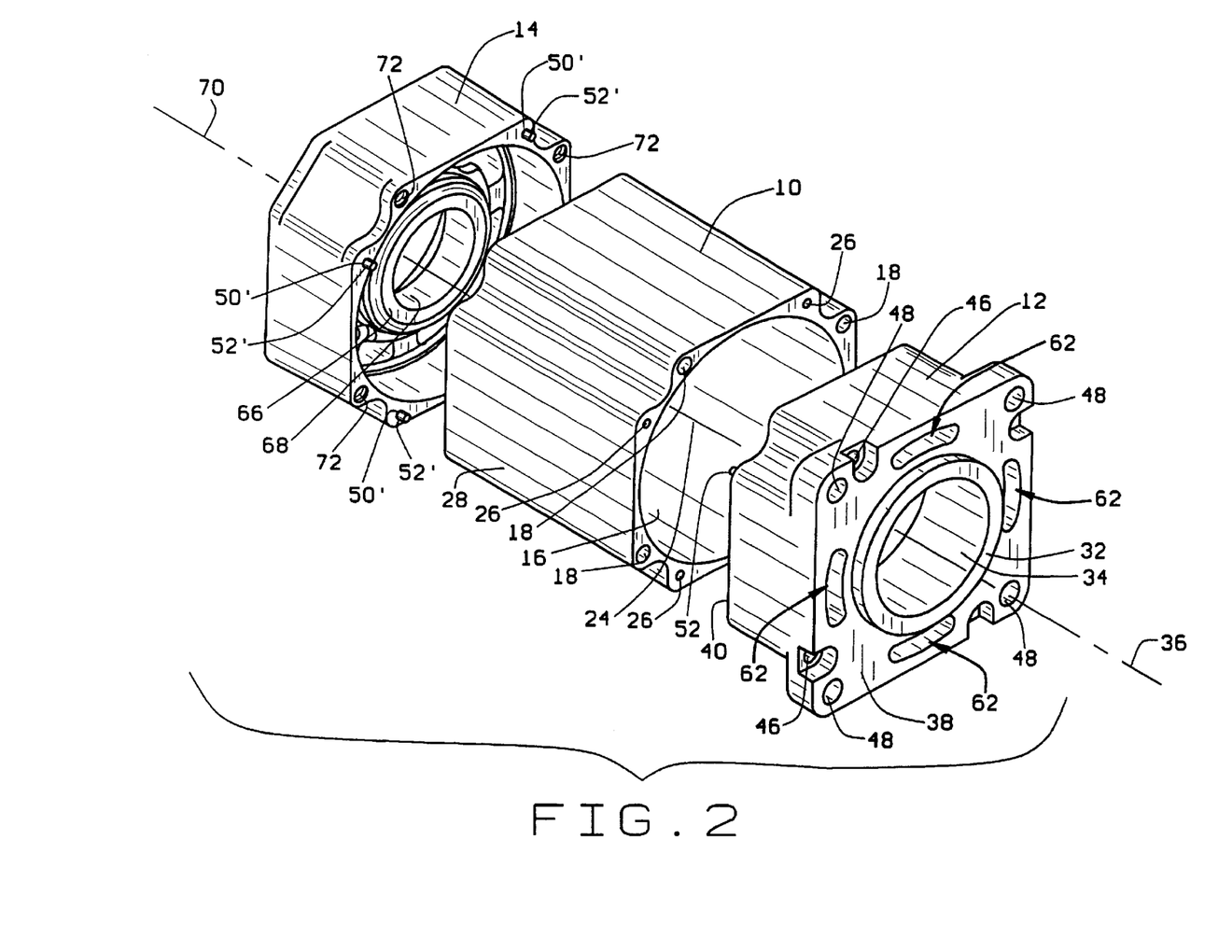
FIG. 2 is a view similar to FIG. 1 but with the motor turned 180°.

FIG. 1 shows the three primary component parts that make up the enclosure of the motor construction of the invention, those being a housing shell 10, a first or front endbell 12, and a second or rear endbell 14. The front endbell 12 is the one through which the drive shaft of the motor projects. The labels "front" and "rear" are used for reference only and are not intended to have any limiting meaning.

The housing shell 10 is a rough-form aluminum extrusion having a cylindrical interior surface 16. Four drilled holes 18 pass through the housing shell to allow threaded fasteners to be passed through the shell. The shell has opposite first 20 and second 22 end surfaces that are machined, flat surfaces perpendicular to the center axis 24 of the shell. Four pin holes 26 are machined into each of the first 20 and second 22 end surfaces of the shell. Each of the pin holes 26 extend a set distance into the aluminum of the shell from the first and second end surfaces 20, 22, but do not extend entirely through the shell.

The shell exterior surface 28 has a generally cylindrical configuration with additional material present where necessary to conform to agency-standard form factors and to enclose and protect the through-bolts and shear pins as described above, resulting in the preferred embodiment in a generally rectangular arrangement with a mounting screw clearance region at each of the four corners.

Figure 3A:
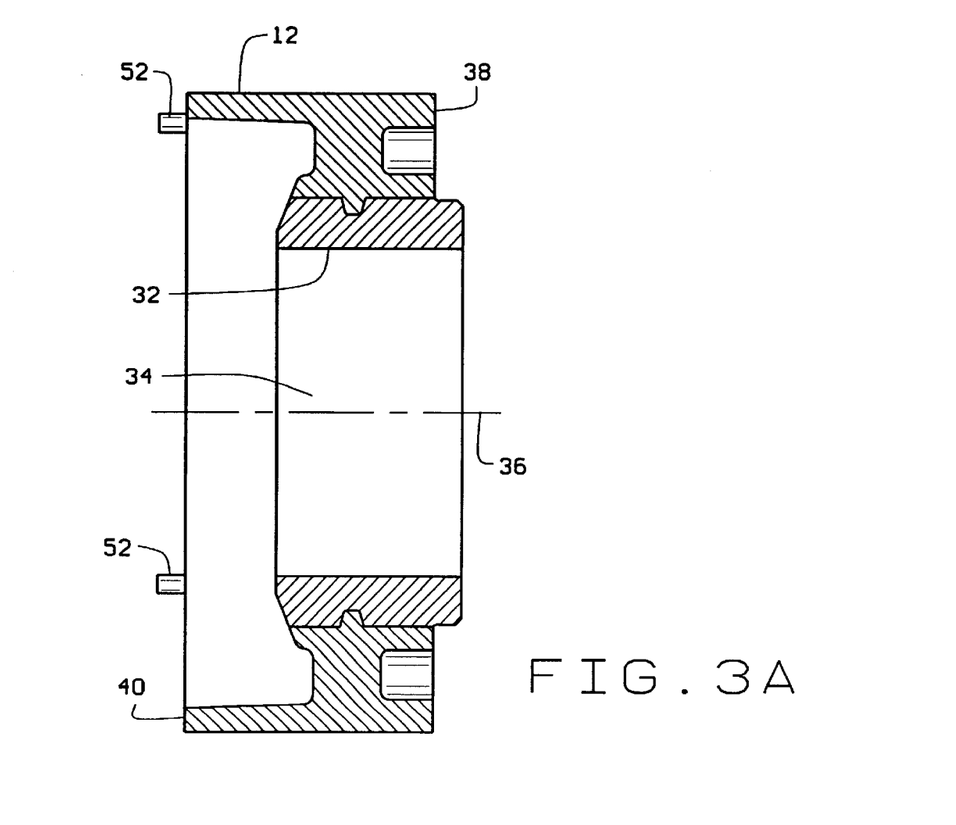
FIGS. 3A–3C are various views of the front endbell.
Figure 3B:
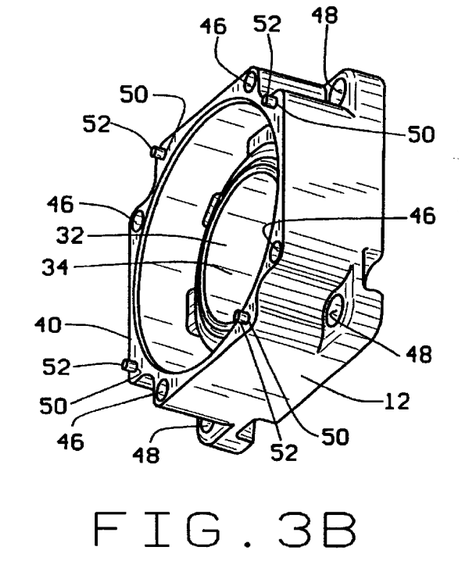
Figure 3C:
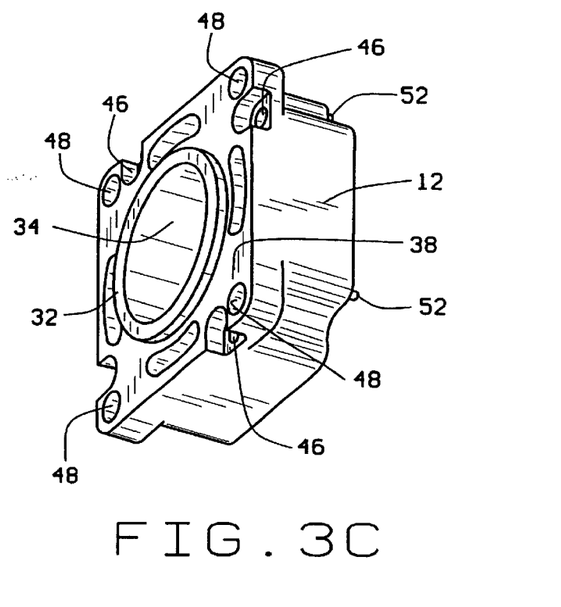

The first or front endbell 12 is comprised of cast metal with a steel bearing support ring 32 cast into the center of the endbell. Several views of the front endbell 12 are shown in FIGS. 1, 3A–3C and 4. As shown in FIG. 3A, the bearing support ring 32 has a cylindrical interior surface 34 that defines a shaft opening with a center axis 36. This interior surface 34 will later be machined to receive a ball bearing assembly. The cast endbell 12 has axially opposite exterior 38 and interior 40 surfaces, with the interior surface being machined flat and perpendicular to the center axis 36. The bearing support ring protrudes forward of the leading surface of the endbell to form the basis of the mounting boss as well as a locating feature for an optional seal. Four bolt holes 46 are machined through the endbell between its exterior 38 and interior 40 surfaces to receive threaded bolts that extend through the endbell, through the drilled holes 18 of the shell housing, and into threaded holes in the rear or second endbell 14 (yet to be described) to hold the two endbells to the opposite end surfaces of the housing shell. Four additional fastener holes 48 are cast in place in the front endbell 12 to receive fasteners used in mounting the motor to another device. Four pin holes 50 are machined into the endbell interior surface 40 at spatially arranged positions corresponding to the positions of the pin holes 26 formed in the first end surface 20 of the housing shell. Like the pin holes in the housing shell, the pin holes 50 in the endbell do not extend entirely through the endbell but only to a set depth below the interior surface 40. Steel pins 52 are inserted into these four pin holes 50. The pins 52 have a predetermined length such that a specific length of the pin will protrude a set distance past the interior surface 40 when they are fully inserted into the pin holes 50, and have diameters that are slightly larger than that of the pin holes. These pins will have a rounded or chamfered edge on one end which inserts into the endbell while having a sharp edge at the other end to enable the pin to broach into the shell material. The length of the pins 52 left projecting from the endbell interior surface 40 are determined so that they will not reach to the bottoms of the pin holes 26 in the housing shell first end surface 20. The pin holes 26 in the shell end surface have a depth that is greater than the exposed length of the pins 52 so that there is room in the end surface pin holes 26 to receive the material broached from the interior sidewalls of the pin holes as the pins are inserted. As the pins 52 are inserted into the pin holes 26, their leading edges broach the interior surface of the pin holes 26 cutting away material from the surface and pushing it into the remaining depth of the pin holes 26. In this manner, the pins 52 are securely held in their respective pin holes 26.

Figure 4:
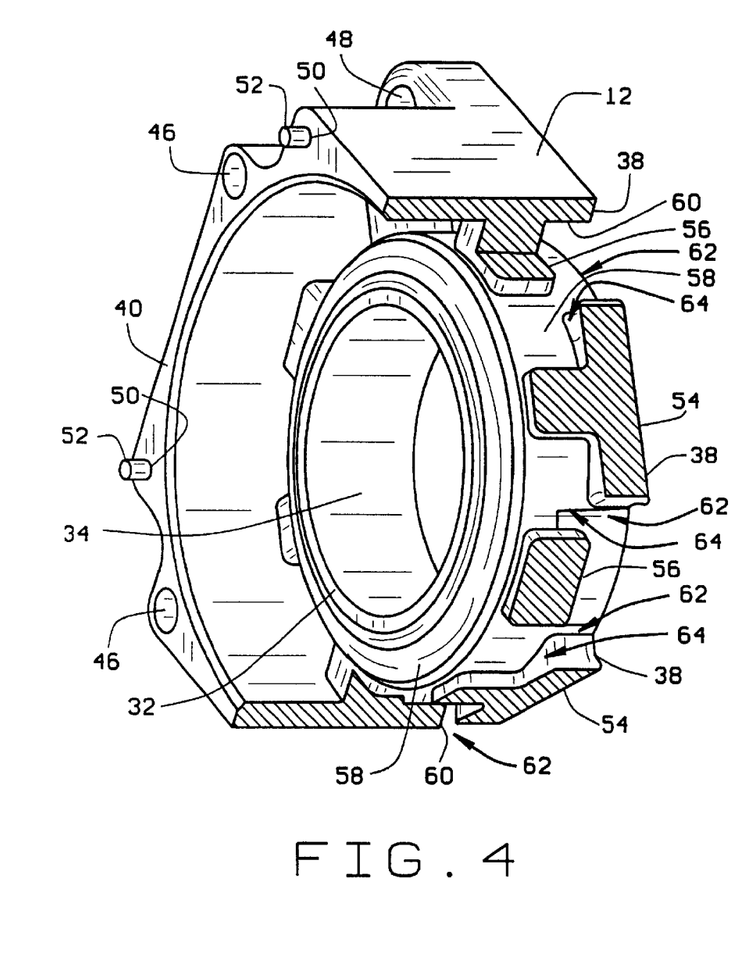
FIG. 4 is a partially sectioned perspective view of the front endbell.
Figure 5A:
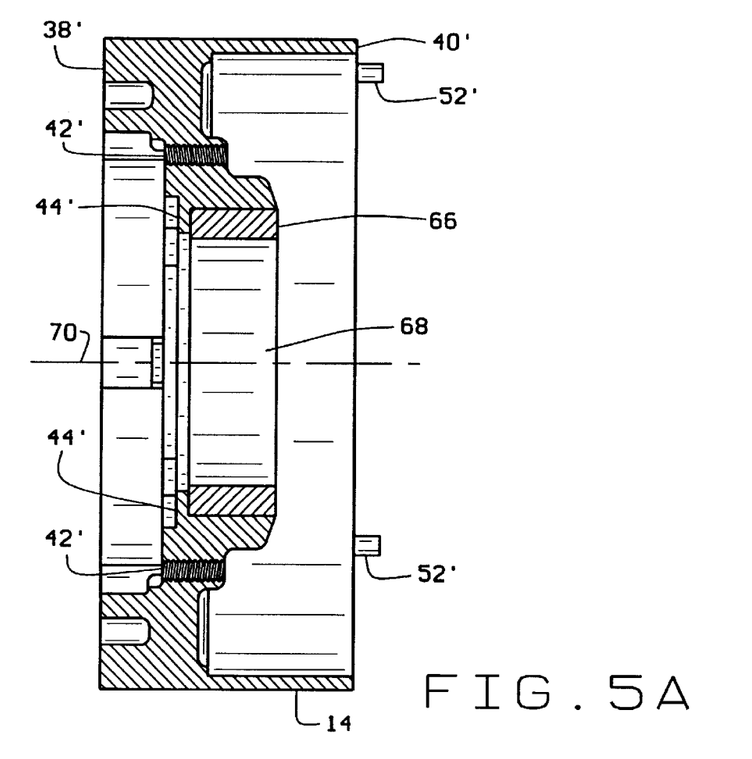
FIGS. 5A–5C are various views of the rear endbell.
Figure 5B:
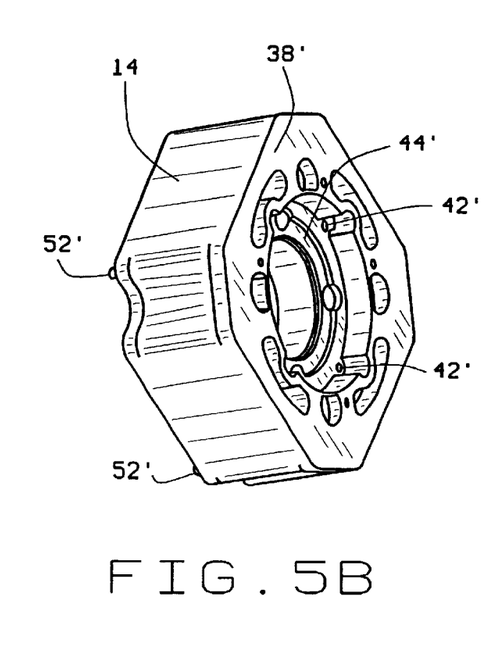
Figure 5C:
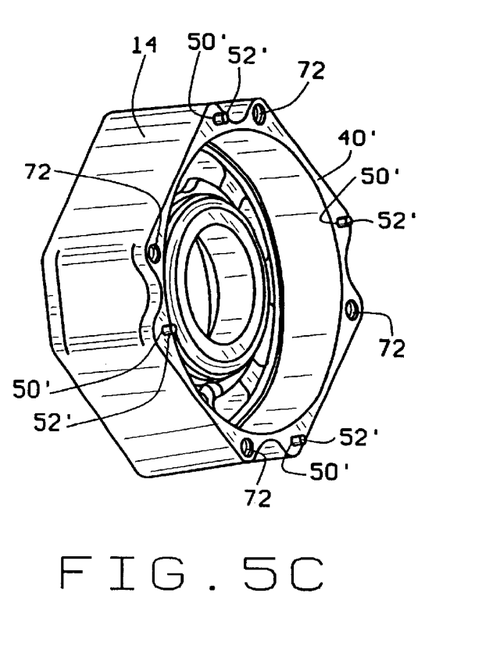
Figure 6:
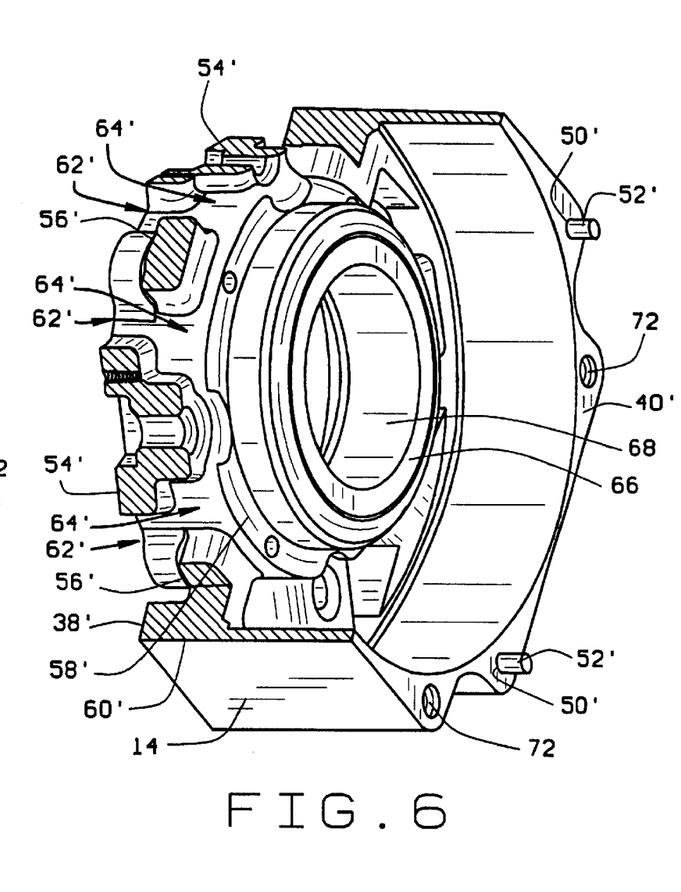
FIG. 6 is a partially sectioned perspective view of the rear endbell.

Referring to FIG. 4, it can be seen that the first or front endbell 12 is cast with a series of axially spaced spokes or spines 54, 56 connecting a center portion 58 of the endbell surrounding the bearing support ring 32 to an exterior portion 60 of the endbell. Large portions of the spokes 54 are positioned adjacently to the exterior surface 38 of the endbell where the other spokes 56 are axially spaced away from the endbell exterior surface 38 and are positioned more toward the endbell interior surface 40. The circumferential and axial spacing of the spokes 54, 56 creates injection openings 62 in the endbell exterior surface 38 that communicate with injection passageways 64 that pass axially between the spokes 54, 56. These injection openings 62 and passageways 64 are employed to allow an impregnating resin or encapsulant to permeate through the endbell surrounding the spokes 56 and securing the endbell 12 in the encapsulant as it cures, which will be described later.

The second or rear endbell 14 is constructed in a similar manner to that of the first or front endbell 12 and component parts of the rear endbell 14 corresponding to those of the front endbell 12 are labeled with the same reference numbers followed by a prime ('). Because the construction of the rear endbell 14 is similar to that of the front endbell 12, it will not be described in detail. However, the construction of the rear endbell 14 differs from that of the front endbell 12 in that the rear steel bearing support ring 66 is smaller than the front bearing support ring 32 and its interior surface 68 defines a smaller shaft opening than that of the front bearing support ring. The rear bearing support ring 66 has a center axis 70. Also, the rear endbell 14 is not machined with through bolt holes 46, but with internally threaded bolt holes 72 that extend into the rear endbell 14 from its interior surface 40' but do not extend entirely through the rear endbell. The internally threaded bolt holes 72 are spatially arranged on the rear endbell interior surface 40' to correspond to the positions of the through bolt holes 46 of the front endbell 12 and to receive threaded bolts inserted through the front endbell bolt holes 46 when attaching the two endbells to the opposite end surfaces of the housing shell 10 as will be described. The rear endbell does not possess fastener holes or the associated shape, but rather has a swept surface which provides maximum bell strength along with cosmetic appeal. A rear bearing retainer annular seat surface 44' and retainer cap fastener holes 42' allow the placement of the rear bearing retainer (to be described later). Apart from these differences, the rear endbell 14 is constructed with opposite exterior and interior surfaces 38', 40', pin holes 50', and steel pins 52', circumferentially and radially spaced spokes 54', 56', connecting a center portion 58' of the endbell with an exterior portion 60' and defining injection openings 62' and injection passages 64' just as in the construction of the front endbell 12.

Figure 7A:
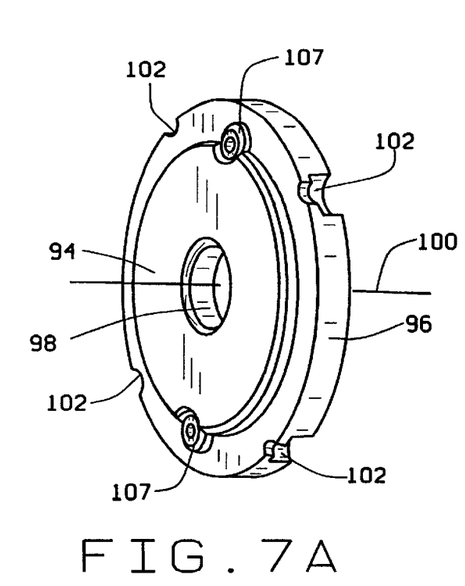
FIGS. 7A and 7B are front and rear views, respectively, of the rear retainer cap.
Figure 7B:
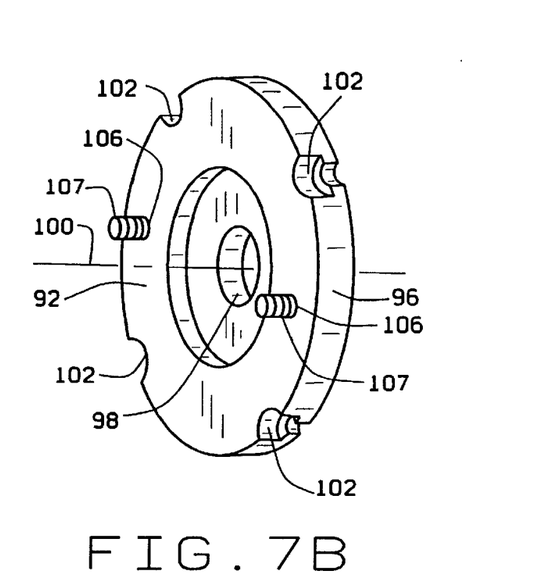

A rear retainer cap 90 is shown in FIGS. 7A and 7B. The rear retainer cap has a circular exterior surface 92, an opposite interior surface 94 and a cylindrical side surface. 96. A center shaft opening 98 passes through the rear retainer cap and has a center axis 100. The exterior surface 92 is registered perpendicular with the center axis 100 and the side surface 96 is registered with the center axis 100 a predetermined distance and is also parallel with the center axis, enabling the placement of the retainer to be held precisely enough to allow it to serve as the mounting for the motor's feedback device. Four mounting screw locating recesses 102 project radially inward from the side surface 96 and receive threaded fasteners used in attaching the rear retainer cap 90 to the rear endbell 14. An extra pair of holes 106 pass through the rear retainer cap 90. These extra holes 106 have enlarged recesses where they emerge from the cap interior surface 94. The enlarged recesses enable a pair of screws 107 to be inserted through the holes 106 with the heads of the screws received in the enlarged recesses and with the lengths of the screws projecting from the holes outwardly from the exterior surface 92 of the cap. These projecting screws may be employed in attaching an external device to the retainer cap, for example in attaching an encoder assembly 109 to the retainer cap such as that shown in FIG. 11.

The component parts of the motor enclosure described to this point together with an impregnating resin or encapsulant, and the method by which they are assembled together with a stator assembly and rotor assembly of the motor make up the subject matter of the invention. The stator assembly construction and the rotor assembly construction of the illustrative embodiment may be varied, as the motor enclosure of the invention and its method of construction may be employed with various different types of stator assemblies and rotor assemblies. Therefore, the stator assembly and rotor assembly of the illustrative embodiment will only be described generally.

The stator 108 is a segmented stator comprised of nine stacks (used as an example, although other numbers of stacks will also be used in other variants of this motor), of stator laminates 110. Individual laminates 110 can be seen in FIG. 8. Each laminate has a general T-shape with a head portion extending across its top and a pole extending downwardly from the head as is common in many segmented stator constructions. Each stack of laminates is insulated with insulator endcaps 112 positioned at opposite ends of the stack (see FIG. 9) and with film insulation slot liners 114 positioned along the opposite sides of the stack (see FIG. 8). Alternatively, the tooth stacks may be insulated by over-molding the part with plastic formed such that the same purpose served by the slot liners and endcaps, described above, is met. The rear endcap 112 has a pair of terminals (not shown) inserted into the molded plastic of the endcap. Each insulated lamination stack is precision wound with a high-density wire coil 116 with the opposite end of each wire coil being terminated on one of the two terminals projecting from the rear endcap. The wound laminate stacks are assembled into a circle, engaging mating tongue and groove connections on the opposite ends of the laminate heads of the stacks in preparation for their being assembled with the housing shell. The stacks are arranged such that the forward surfaces of all stacks are coplanar. The stator center bore 118 is finished when the laminate stacks are assembled in the circle, meaning that no machining of the stator bore 118 is needed.

Figure 8:
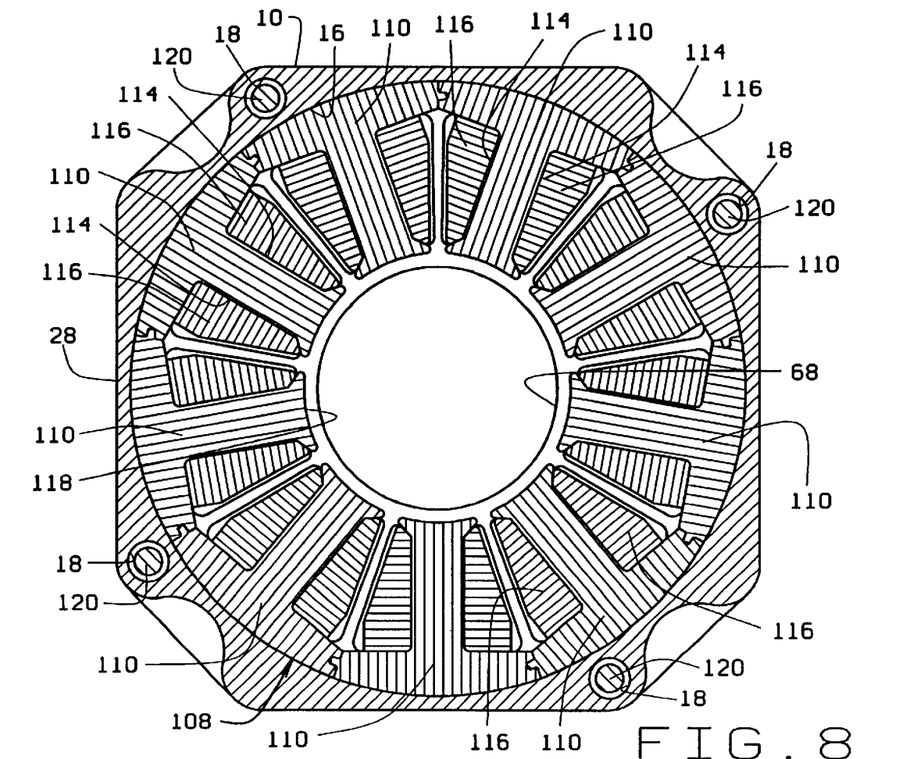
FIG. 8 is a cross-section view of the housing shell containing the stator.
Figure 9:
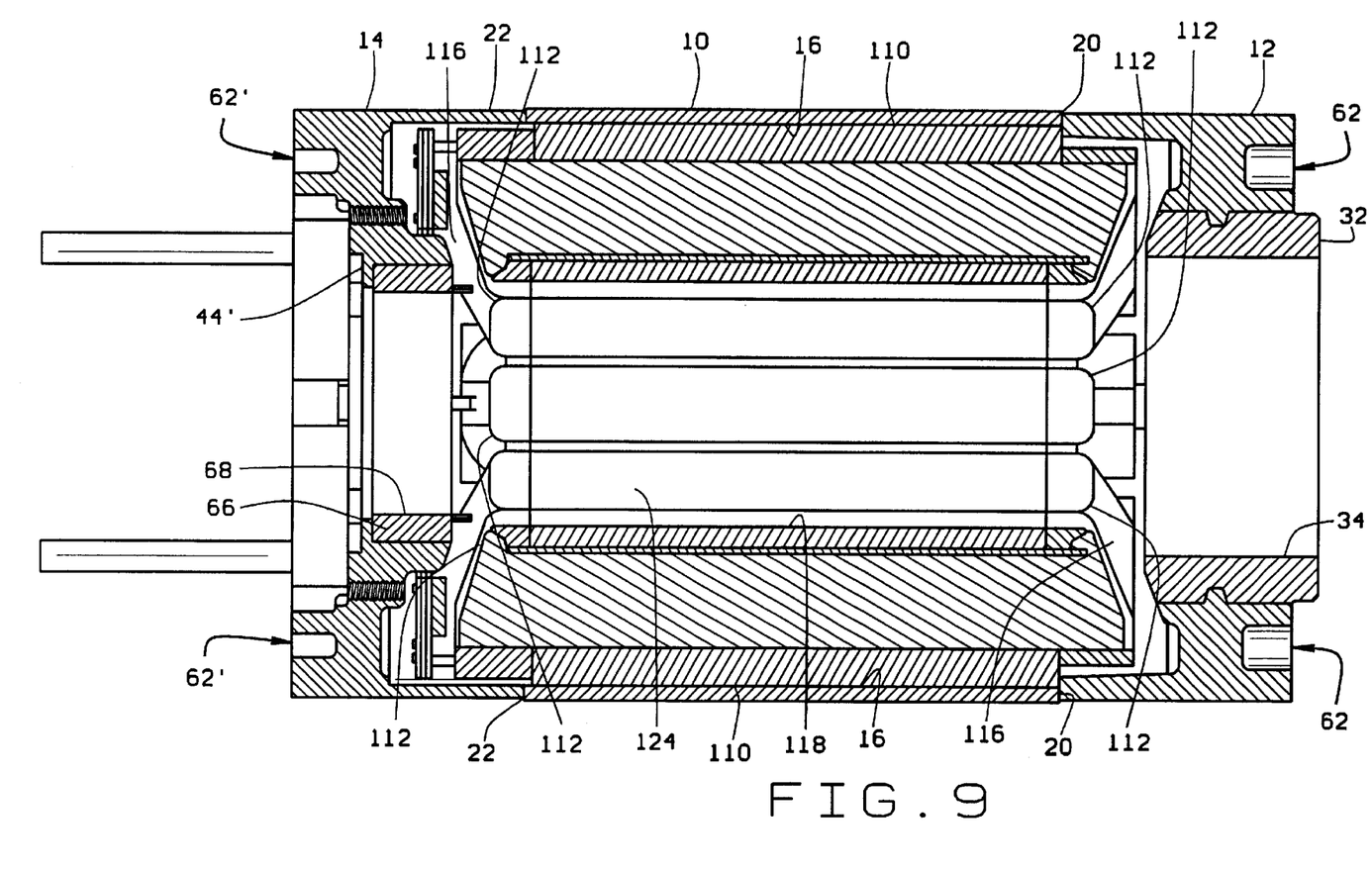
FIG. 9 is a side-sectioned view of the motor enclosure containing a stator prior to encapsulant injection and machining.

The housing shell 10 is rapidly heated, causing the interior diameter of the shell to expand slightly, and is then dropped while still hot over the circular cluster of wound tooth stacks. The forward surface of the shell 10 will be aligned with the coplanar surfaces of the tooth stacks, resulting in a single planar surface, and the radial orientation of the shell in relation to the tooth stack cluster is precisely controlled. The shell 10 engaging around the cluster of wound stator stacks acts to hold the stacks in their circular arrangement with no welds required between the stacks or between the individual laminates. FIG. 8 shows the housing shell 10 surrounding the nine laminate stacks (for example, although other numbers will be used in variants of the design). A printed wiring board (not shown) is then connected to the pairs of terminals of each of the stator windings and is positioned adjacently the stator windings in the rear end of the housing shell.

The endbells 12, 14 are positioned adjacently to the opposite first and second end surfaces 20, 22, respectively, of the housing shell with the bearing bores of either endbell precisely aligned with the bore of the stator, and the pins 52 projecting from the front endbell 12 being generally aligned with the pin holes 26 in the housing shell first end surface 20 and the pins 52' projecting from the rear endbell 14 being generally aligned with the pin holes 26 in the housing shell second end surface 22. The endbells 12, 14 are then pressed into position over the first 20 and second 22 end surfaces of the housing shell with the pins broaching into the pin holes of the shell end surfaces pushing material of the housing shell cut away from the interior surfaces of the pin holes 26 to the unused depth of the pin holes as described earlier. This step provides a precise and tolerance independent fit of the endbells over the opposite first and second end surfaces of the housing shell that would not be possible with fasteners inserted through the bolt holes 46 of the front endbell 12 which are dimensioned slightly larger than the fasteners they accommodate permitting some relative sheer and torsional movement of the front endbell 12 relative to the fasteners and the housing shell 10. The pins resist relative sheer and torsional forces between the endbells and the housing shell and hold the endbells in precisely registered positions relative to the housing shell and the stator contained in the shell. This assembly method enables bearing bores and a retainer cap seat to be later machined into the endbells in precisely registered positions relative to the stator bore center axis. Threaded bolts 120 are then inserted through the bolt holes 46 in the front endbell 12, through the housing shell channels 18 and are threaded and tightened into the internally threaded bolt holes 72 in the rear endbell 14, securely holding the two endbells to the opposite end surfaces of the housing shell and providing additional resistance to sheer and torsional movement of the endbells relative to the housing shell.

A removable core (not shown) is then inserted through the shaft opening of the larger of the endbell bearing support rings, through the stator bore 118, and through the shaft opening in the opposite endbell support ring in preparation for injection of the impregnating resin encapsulant. The impregnating resin is then injected through one or more of the injection openings 62' in the rear endbell 14. The resin surrounds the spokes 54' as it passes through the injection passages 64' of the rear endbell and flows axially through the stator assembly except for the stator bore which is occupied by the core. Injecting the resin axially through the endbells and stator facilitates its permeating the open voids of the stator. The injection of the resin is continued until it passes around the spokes 54 of the front endbell 12 and passes out of the enclosure through the injection openings 62 of the front endbell, thus filling all of the open voids in the stator and the endbells. The encapsulating resin is then cured.

Figure 10:
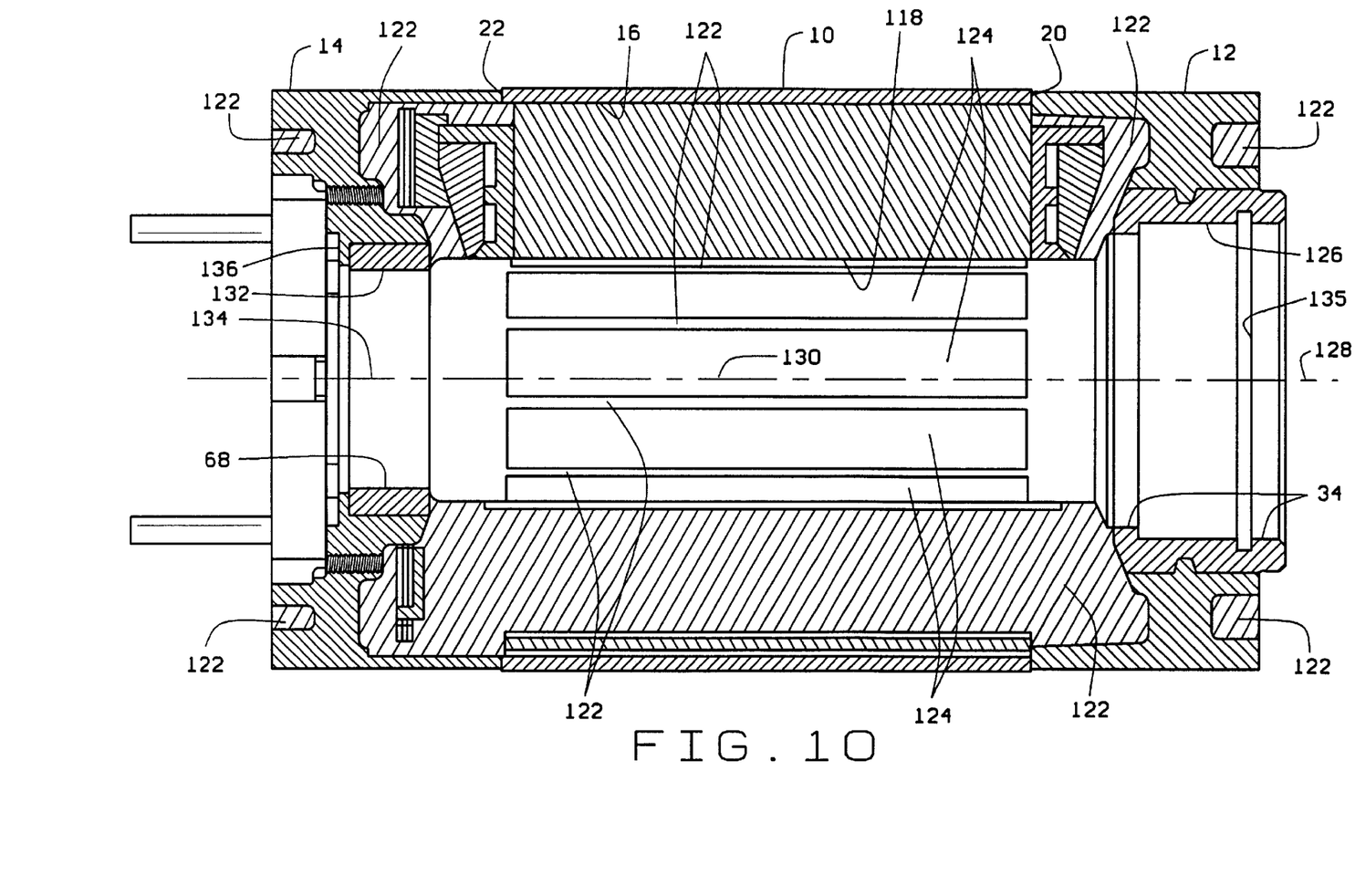
FIG. 10 is a view similar to FIG. 9 after encapsulant injection and after the front and rear endbell bearing bores and rear retainer cap seat have been machined.

Following curing, the core is removed and any cured encapsulant projecting from the injection openings 62, 62' of the two endbells is removed giving the exterior surfaces of the two endbells a smooth appearance. At this point in the motor's construction, it appears as shown in FIG. 10 with the cured encapsulant 122 filling all open voids in the stator assembly with only the stator bore 118, the rear shaft opening defined by the rear bearing support ring surface 68 and the front shaft opening defined by the front bearing support ring surface 34 being devoid of encapsulant. The stator bore 118 has a cylindrical interior surface defined by the end surfaces 124 of the stacked laminate poles and the cured encapsulant 122 surrounding these end surfaces.

As shown in FIG. 10, the front bearing bore 126 is then machined into the steel bearing support ring cast into the front endbell. The front bearing bore is machined with its center axis 128 referenced from or coaxially aligned with the center axis 130 of the stator bore. Simultaneously, or in a subsequent operation, the rear bearing bore 132 is machined into the steel bearing support ring cast into the rear endbell. The rear bearing bore center axis 134 is referenced from the front bearing bore axis 128.

Front bearing retainer ring groove 135 and rear retainer seat 136 are then machined into the endbells. Both details are machined concentric to and referenced from the stator bore center axis 130. The depths to which these details are machined into the respective front and rear endbells are referenced from or are in register with the stator bore center axis and the axial depth of the front bearing bore.

Figure 11:
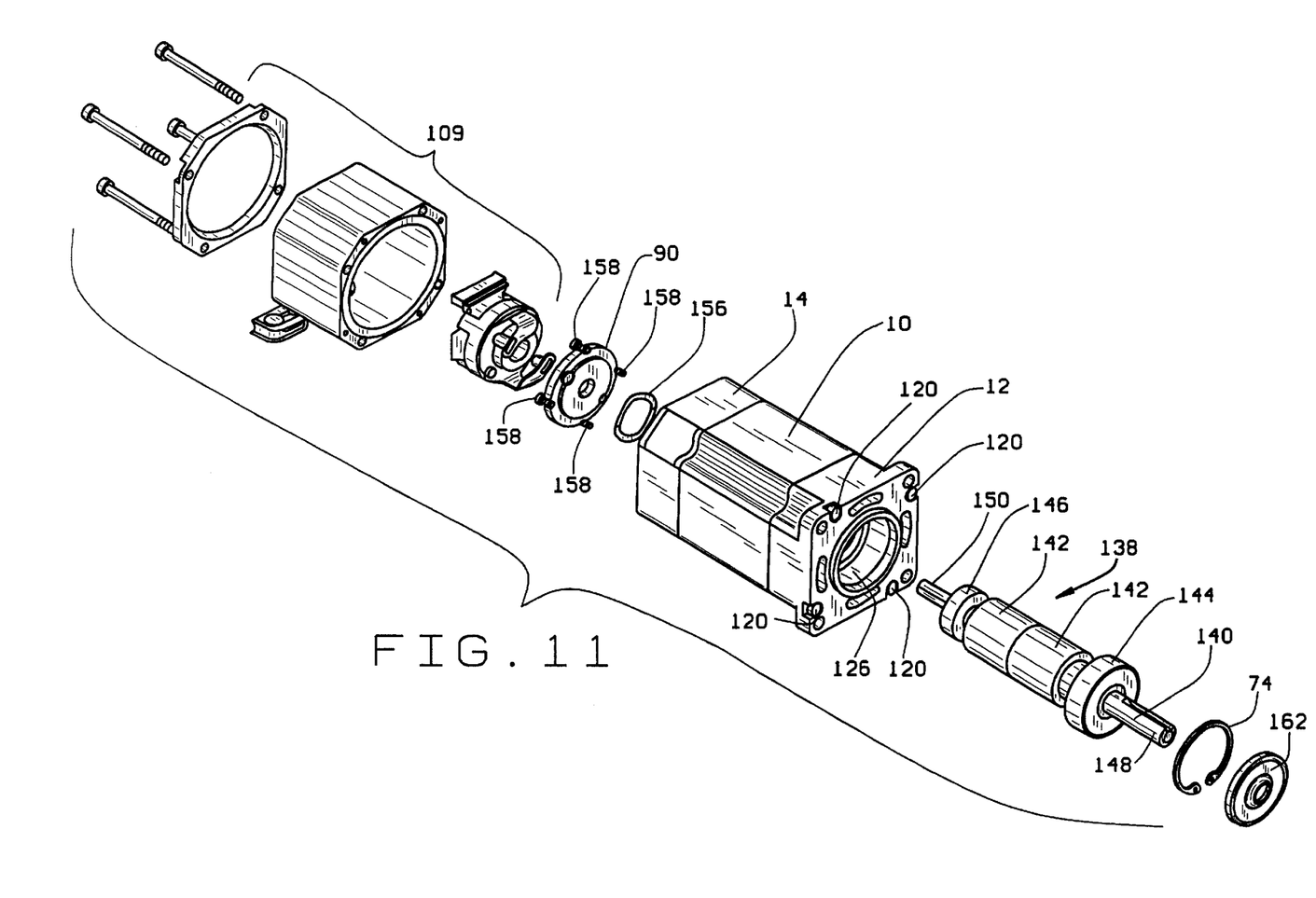
FIG. 11 is an exploded view showing the component parts employed in assembling the rotor assembly into the motor, with a representative feedback device shown for illustrative purposes (although other devices will be used as well)
Figure 12:
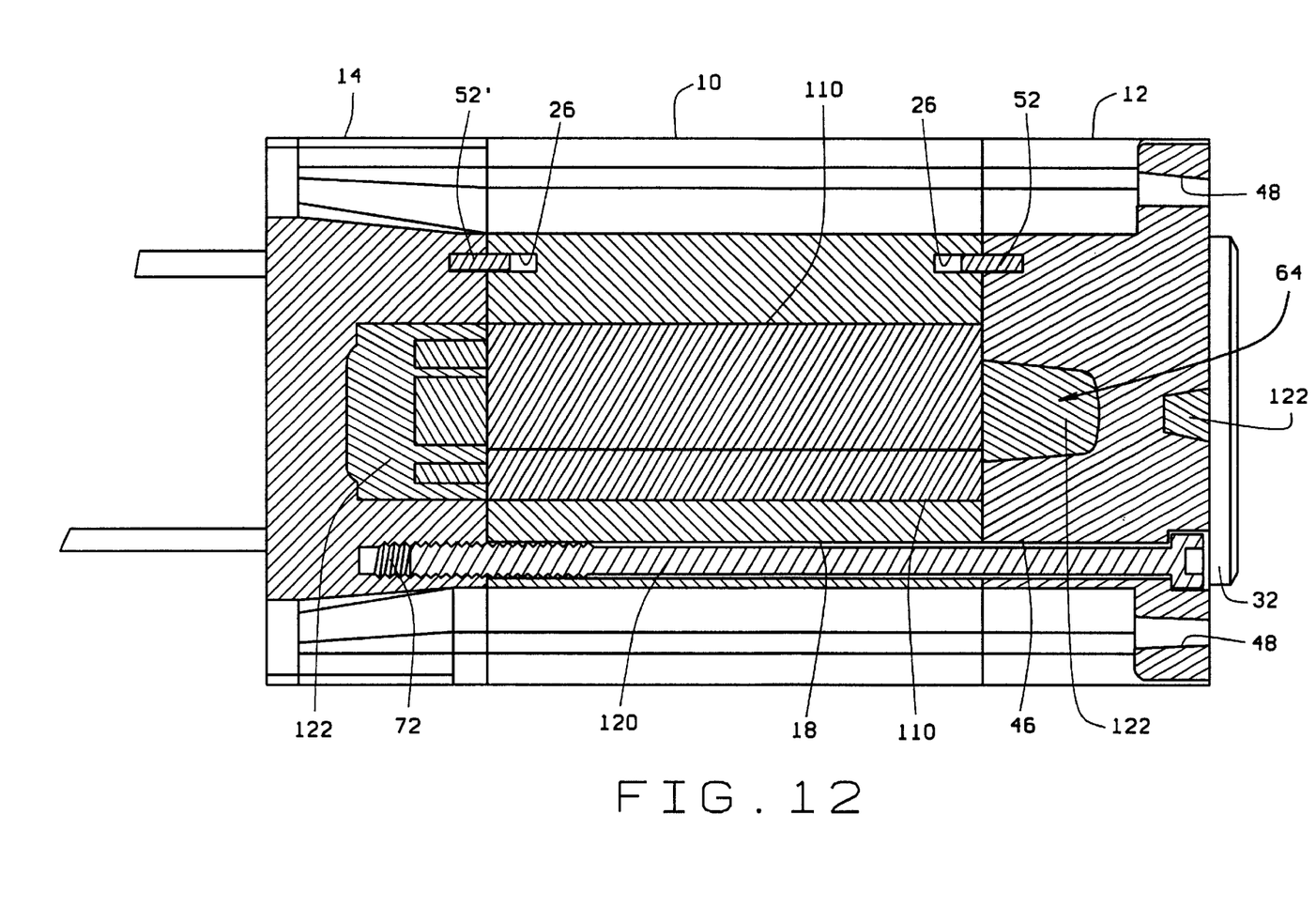
FIG. 12 is a section view taken in a plane along the line 12—12 of FIG. 11 which shows the method by which the endbells are secured to the stator assembly, with a representative feedback device included for clarity, similarly to FIG. 11.

FIG. 11 illustrates the assembly of the rotor 138 into the stator and the motor enclosure. The rotor is comprised of a magnetic steel rotor shaft 140 having a series of magnetic rings 142 bonded on its exterior. Ball bearings 144, 146 are pressed onto fixed positions on the opposite ends of the rotor shaft at opposite ends of the magnet rings with the bearing 146 on the rear end 150 of the shaft being smaller than the bearing 144 on the front end 148 of the shaft. The larger bearing must be located on the end of the shaft which is expected to see the greatest radial load.

The rotor 138 is inserted into the stator by first inserting the rearward end 150 of the rotor with its smaller bearing 146 through the larger bearing bore 126 at the front endbell of the rotor. The rearward end 150 of the shaft and its smaller bearing are guided through the stator bore 118 until the rear bearing 146 is positioned adjacent to the bearing bore 132 in the rear endbell and the front bearing 144 is positioned adjacent to the bearing bore 126 in the front endbell. The rear bearing 146 is then located into the machined bearing support ring 66 in the rear endbell and the front bearing 144 is simultaneously pressed into the machined bearing support ring 32 in the front endbell until it engages against the annular shoulder 152 formed in the bearing support ring.

Figure 13:
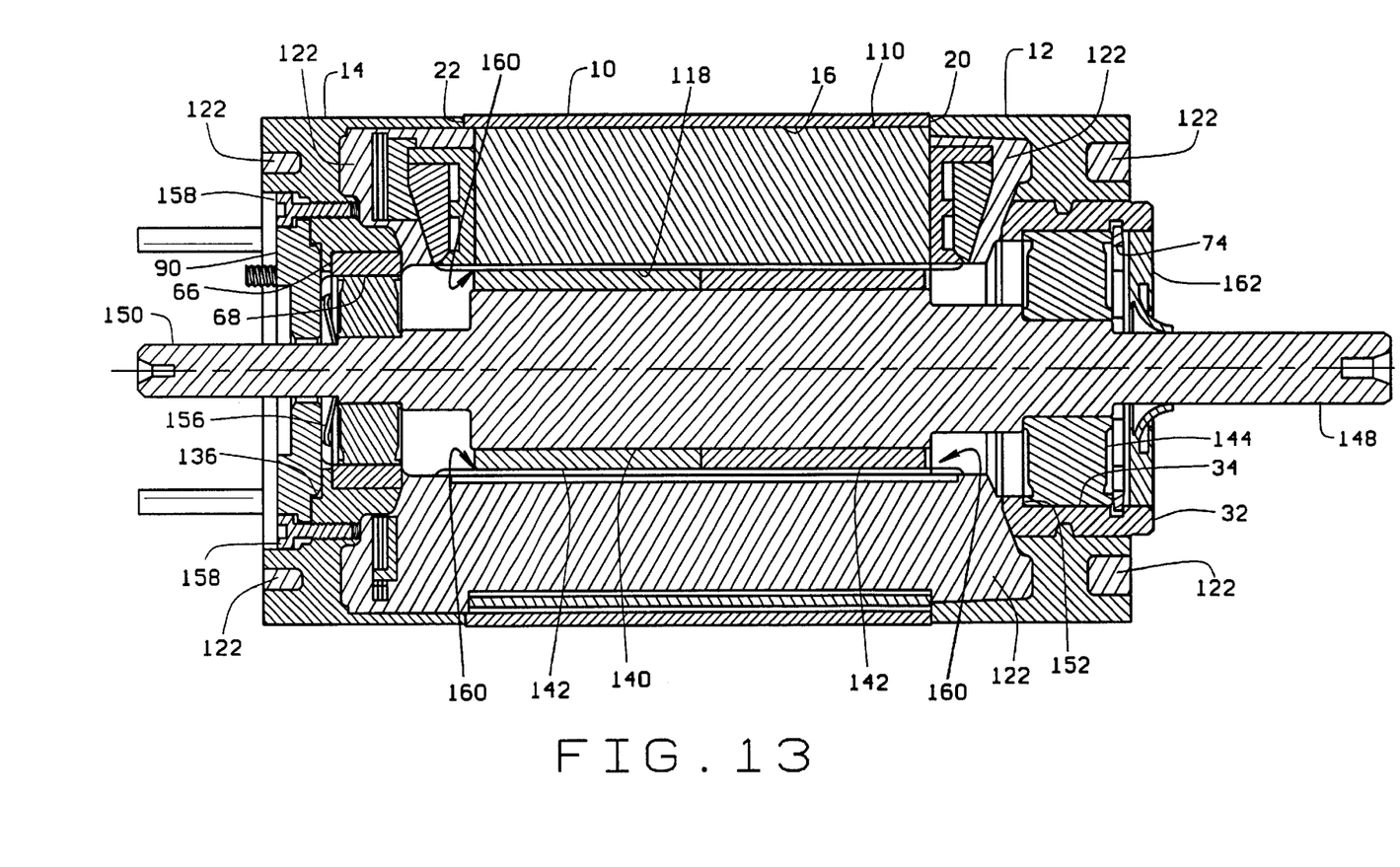
FIG. 13 is a side-section view of the completed motor assembly.

The front bearing retainer device 74 is then placed over the forward end 148 of the rotor shaft and is seated against the front bearing outer race and within the beveled groove 135. An optional shaft seal 162 may also be inserted into the support ring 32. A bearing preload spring 156 is then placed over the rear end 150 of the rotor shaft and against the outer race of the rear bearing 146. The rear bearing retainer cap 90 is then placed over the rear end 150 of the shaft and against the preload spring 156 and is secured to the rear endbell by screws 158. The rear retainer cap 90 is positioned in the machined annular seat 136 that is precisely located in relation to the front bearing bore 126, resulting in the virtual elimination of variation in bearing preloading due to tolerance stack up. The completed motor is shown in FIG. 13.

The method of machining described here enables the rear bearing retainer details to be kept parallel and perpendicular to the axis of the stator bore, allowing the rear bearing retainer to be used to accurately mount feedback devices.

The construction of the motor and its method of assembly maintains precision positioning of the rotor at the center of the stator bore with a uniform air gap 160 between the stator bore interior surface and the rotor exterior surface and with the rotor center axis precisely aligned with the center axis of the stator bore 130 as well as the center axes 128, 132 of the rotor bearings.

While the present invention has been described by reference to a specific embodiment, it should be understood that modifications and variations of the invention may be constructed without departing from the scope of the invention defined in the following claims.

What is claimed is:

1. An electromagnetic device comprising:

a plurality of stator teeth arranged in a circular pattern;

a shrunken shell around the plurality of stator teeth, the shell having axially opposite first and second end surfaces and a hole that extends through the shell and the first and second end surfaces, the hole has an interior surface that engages around the plurality of stator teeth and the stator teeth are held in the circular pattern solely by the shrunken shell;

the shell is a single monolithic piece and the plurality of stator teeth are each individual, segmented teeth arranged in a circular pattern inside the hole of the stator shell; and the shell is an extruded shell and the hole through the shell has been bored through the shell.

2. The electromagnetic device of claim 1, wherein:

the shell has been shrunken around the stator teeth by having been hot dropped round the plurality of stator teeth and subsequently cooled.

3. The electromagnetic device of claim 1 wherein:

there is no separate attachment between the segmented teeth of the plurality of stator teeth.

4. The electromagnetic device of claim 1, wherein:

each stator tooth of the plurality of stator teeth is comprised of a plurality of stator tooth laminations, and each stator tooth lamination has a head portion and a pole portion that together have a T-shape, the head portions of adjacent stator tooth laminations engage with each other and the pole portions of adjacent stator tooth laminations project from the head portions toward a center of the circular pattern of the plurality of stator teeth.

5. The electromagnetic device of claim 4, wherein:

the head portions of adjacent stator tooth laminations have tongue and groove engagements between the head portions.

6. The electromagnetic device of claim 4, wherein:

the pole portions of adjacent stator tooth laminations are spaced from each other.

7. The electromagnetic device of claim 1, wherein:

each stator tooth of the plurality of stator teeth is comprised of a stack of stator tooth laminations and each stack of stator tooth laminations is surrounded by an individual winding.

8. An electromagnetic device comprising:

a plurality of separate, individual stator teeth, the plurality of stator teeth being arranged in a circular pattern with adjacent stator teeth of the plurality engaging with each other;

a shrunken shell having a hole passing through the shell and a cylindrical interior surface surrounding the hole, the cylindrical interior surface of the shrunken shell extends around the plurality of stator teeth and engages with each stator tooth of the plurality of stator teeth, the shrunken shell thereby holding the plurality of stator teeth in the circular pattern;

each stator tooth of the plurality of stator teeth is comprised of a stack of stator tooth laminations and each stack of stator tooth laminations is surrounded by an individual winding; and each stator tooth of the plurality of stator teeth is also comprised of a pair of insulator endcaps at axially opposite ends of each stator tooth and the winding of each stator tooth wraps over the endcaps.

9. The electromagnetic device of claim 8, wherein:

the shell is a single monolithic piece and the plurality of stator teeth are each individual, segmented teeth arranged in a circular pattern inside the hole of the stator shell.

10. The electromagnetic device of claim 8, wherein:

each stator tooth of the plurality of stator teeth has a head portion and a pole portion, the head portions of adjacent stator teeth engage with each other and the pole portions of the plurality of stator teeth project from the head portions toward a center of the circular pattern of the plurality of stator teeth.

11. The electromagnetic device of claim 10, wherein:

the pole portions of adjacent stator teeth of the plurality of stator teeth are spaced from each other.

12. The electromagnetic device of claim 10, wherein:

the head portions of adjacent stator teeth have tongue and groove engagements between the head portions.

13. The electromagnetic device of claim 8 wherein:

there is no separate attachment between adjacent, engaging stator teeth of the plurality of stator teeth.

14. The electromagnetic device of claim 8, wherein:

the plurality of stator teeth are held in the circular pattern solely by the cylindrical interior surface of the shell.

15. The electromagnetic device of claim 8, wherein:

the shell and the cylindrical interior surface of the shell are one, monolithic piece.

16. An electromagnetic device comprising:

a plurality of separate, individual stator teeth, the plurality of stator teeth being arranged in a circular pattern with adjacent stator teeth of the plurality of engaging with each other;

a shrunken shell having a hole passing through the shell and a cylindrical interior surface surrounding the hole, the cylindrical interior surface of the shrunken shell extends around the plurality of stator teeth and engages with each stator tooth of the plurality of stator teeth, the shrunken shell thereby holding the plurality of stator teeth in the circular pattern;

the shell and the cylindrical interior surface of the shell are one, monolithic piece; and the shell is an extruded shell and the hole in the shell has been bored through the shell.

17. The electromagnetic device of claim 16, wherein:

the shell hole has a length and each stator tooth has a length that is the same as the length of the shell hole.

* * * * *